(12) United States Patent
Yuan et al.

(10) Patent No.: US 9,953,400 B2
(45) Date of Patent: *Apr. 24, 2018

(54) ADAPTIVE PATH SMOOTHING FOR VIDEO STABILIZATION

(71) Applicant: Microsoft Technology Licensing, LLC, Redmond, WA (US)

(72) Inventors: Lu Yuan, Beijing (CN); Jian Sun, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,645

(22) Filed: Jun. 12, 2017

(65) Prior Publication Data

US 2017/0278219 A1    Sep. 28, 2017

Related U.S. Application Data (63) Continuation of application No. 14/904,944, filed as application No. PCT/CN2013/079852 on Jul. 23, 2013, now Pat. No. 9,697,587.

(51) Int. Cl.
*G06K 9/00* (2006.01)
*G06T 5/00* (2006.01)
(Continued)

(52) U.S. Cl.
CPC ............... *G06T 5/001* (2013.01); *G06T 5/002* (2013.01); *G06T 5/20* (2013.01); *G06T 5/50* (2013.01);
(Continued)

(58) Field of Classification Search
CPC ............... G06K 9/00; H04N 5/00; G06T 5/00
(Continued)

(56) References Cited

U.S. PATENT DOCUMENTS 6,310,857 B1 * 10/2001 Duffield ............. H04Q 11/0478
370/232
7,221,776 B2    5/2007 Xiong
(Continued)

FOREIGN PATENT DOCUMENTS

| CN | 101009021 A | 8/2007 |
| CN | 102742260 | 10/2012 |

OTHER PUBLICATIONS

Baker, et al., Removing Rolling Shutter Wobble, IEEE Conference on Computer Vision and Pattern Recognition, retrieve from http://ieeexplore.ieee.org/xpl/login.jsp?tp=&arnumber=5539932, published on Jun. 13, 2010, 8 pages.

(Continued)

*Primary Examiner* — Abolfazl Tabatabai (57) ABSTRACT

Techniques and architectures for video stabilization can transform a shaky video to a steady-looking video. A path smoothing process can generate an optimized camera path for video stabilization. With a large smoothing kernel, a path smoothing process can remove both high frequency jitters and low frequency bounces, and at the same time can preserve discontinuous camera motions (such as quick panning or scene transition) to avoid excessive cropping or geometry distortion. A sliding window based implementation includes a path smoothing process that can be used for real-time video stabilization.

20 Claims, 6 Drawing Sheets

(51) Int. Cl.
| | |
|---|---|
| *G06T 5/20* | (2006.01) |
| *G06T 5/50* | (2006.01) |
| *H04N 5/232* | (2006.01) |
| *G06T 7/246* | (2017.01) |
| *H04N 21/414* | (2011.01) |
| *H04N 21/422* | (2011.01) |
| *H04N 21/433* | (2011.01) |
| *H04N 21/44* | (2011.01) |
| *H04N 21/442* | (2011.01) |
| *H04N 5/228* | (2006.01) |

(52) U.S. Cl.
CPC ......... *G06T 7/246* (2017.01); *H04N 5/23267* (2013.01); *H04N 21/41407* (2013.01); *H04N 21/42202* (2013.01); *H04N 21/4334* (2013.01); *H04N 21/44* (2013.01); *H04N 21/44218* (2013.01); *G06T 2207/10016* (2013.01); *G06T 2207/20004* (2013.01); *G06T 2207/20024* (2013.01); *G06T 2207/20028* (2013.01); *G06T 2207/20182* (2013.01); *G06T 2207/30241* (2013.01); *G06T 2207/30244* (2013.01)

(58) Field of Classification Search
USPC ........ 382/103, 107, 236; 348/14.1, 169–172, 348/208.1, 352, 536, 572; 370/232
See application file for complete search history.

(56) References Cited

U.S. PATENT DOCUMENTS

| | | | | |
|---|---|---|---|---|
| 7,471,340 | B1* | 12/2008 | Chowdhury | H03L 7/08 348/536 |
| 7,558,405 | B2 | 7/2009 | Tico et al. | |
| 8,270,752 | B2 | 9/2012 | Yea et al. | |
| 9,697,587 | B2* | 7/2017 | Yuan | H04N 5/23267 |
| 2009/0213234 | A1 | 8/2009 | Chen | |
| 2010/0165123 | A1 | 7/2010 | Wei | |
| 2011/0193978 | A1 | 8/2011 | Wu | |
| 2013/0127993 | A1 | 5/2013 | Wang | |
| 2016/0140695 | A1 | 5/2016 | Yuan et al. | |

OTHER PUBLICATIONS

Bay, et al., Speeded-Up Robust Features (SURF), Journal of Computer Vision and Image Understanding, vol. 110, Issue 3, retrieved from http://staff.science.uva.nl/~cgmsnoek/CS294/papers/bay-surf-cviu.pdf, published Jun. 2008, 14 pages.

Brox, et al., High Accuracy Optical Flow Estimation Based on a Theory for Warping, Proceedings of the 8thy European Conference on Computer Vision, retrieved from http://www.cecs.uci.edu/~papers/icme05/defevent/papers/cr1147/pdf, published May 2004, 12 pages.

Buehler, et al.,, Non-Metric Image-Based Rendering for Video Stabilization, IEEE Computer Society Conference on Computer Vision and Pattern Recognition, retrieved from http://ieeexplore.ieee.org/stamp/stamp.jsp? tp=&arnumber=991019, published on Dec. 8, 2001, 6 pages.

Chang, et al.,, Analysis and Compensation of Rolling Shutter Effect, Jornal of IEEE Transactions on Image Processing, vol. 17, Issue 8, retrieved from http://mpac.ee.ntu.edu.tw/~chiakai/papers/liang_tip08.pdf, published Aug. 2008, 8 pages.

Chen, et al., Capturing Intention-Based Full-Frame Video Stabilization, Journal of Computer Graphics Forum, vol. 27, Issue 7, retrieved from http://ntur.lib.ntu.edu.tw/bitstream/246246/154499/1/12.pdf, published Oct. 2008, 10 pages.

Cho, et al., Video Deblurring for Hand-Held Cameras Using Patch-Based Synthesis, Journal ACM Transactions on Graphics, vol. 31, Issue 4, retrieved from http://cg.postech.ac.kr/research/video_deblur/video_deblur.pdf, published Jul. 2012, 9 pages.

David G. Lowe, Object Recognition from Local Scale-Invariant Features, Seventh IEEE International Conference on Computer Vision, vol. 2, retrieved from http://www.cs.ubc.ca/~lowe/papers/iccv99.pdf, published Sep. 20, 1999, 8 pages.

The European Office Action dated Jan. 27, 2017 for European patent application No. 13889978.6, a counterpart foreign application of U.S. Appl. No. 14/904,944, 6 pages.

The European Office Action dated Jul. 21, 2016 for European Patent Application No. 13889978.6, a counterpart foreign application of U.S. Appl. No. 14/904,944, 7 pages.

The Supplementary European Search Report mailed Jul. 6, 2016 for European Patent Application No. 13889978.6, a counterpart foreign application of U.S. Appl. No. 14/904,944, 3 pages.

Farbman, et al., Edge-Preserving Decompositions for Multi-Scale Tone and Detail Manipulation, ACM Transactions on Graphics— SIGGRAPH, vol. 27, Issue 3, retrieved from http://www.cs.huji.ac.il/~danix/epd/epd.pdf, published Aug. 2008, 10 pages.

Fischler, et al., Random Sample Consensus: A Paradigm for Model Fitting with Applications to Image Analysis and Automated Cartography, Magazine Communications of the ACM, vol. 24, Issue 6, retrieved from http:/www.ai.sri.com/pubs/files/836.pdf, published Jun. 1981, 15 pages.

Forssen, et al., Rectifying Rolling Shutter Video from Hand-Held Devices, IEEE Conference on Computer Vision and Pattern Recognition, retrieved from https://www.cvl.isy.liu.se/research/rs-dataset/0382.pdf,, published on Jun. 13, 2010, 8 pages.

Gao, et al., Constructing Image Panoramas Using Dual-Homography Warping, IEEE Conference on Computer Vision and Pattern Recognition, retrieved from http://www.comp.nus.edu.sg/~brown/pdf/cvpr_dualhomography2011.pdf, published Jun. 20, 2011, 9 pages.

Gleicher, et al., Re-Cinematography: Improving the Camera Dynamics of Casual Video, Proceedings of the 15th International Conference on Multimedia, retrieved from http://research.cs.wisc.edu/graphics/Papers/Gleicher/Video/mm07-recin.pdf, , published Sep. 23, 2007, 10 pages.

Goldstein, et al., Video Stabilizaton Using Epipolar Geometry, Journal of ACM Transactions on Graphics, vol. 31, Issue 5, retrieved from http://www.cs.huji.ac.il/~raananf/projects/stab/paper.pdf, published Aug. 2012, 10 pages.

Grundmann, et al., Calibration-Free Rolling Shutter Removal, IEEE International Conference on Computational Photography, retrieved from http://www.cc.gatech.edu/cpl/projects/rollingshutter/iccp2012_rollingshutter.pdf,, published Apr. 28, 2012, 8 pages.

Grundmann, et al., "Auto-Directed Video Stabilization with Robust L1 Optimal Camera Paths", 2011 IEEE Conference and Computer Vision and Pattern Recognition, Jun. 20, 2011, IEEE, pp. 225-232.

Grundmann, et al., Auto-Directed Video Stabilization with Robust L1 Optimal Camera Paths, Proceeding of IEEE Conference on Computer Vision and Pattern Recognition, retrieved from http://www.cc.gatech.edu/~irfan/p/2011-Grundmann-AVSWROCP.pdf, published Jun. 20, 2011, 8 pages.

Igarashi, et al., As Rigid-As-Possible Shape Manipulation, Proceedings: In Journal of ACM Transactions on Graphics of SIGGRAPH, vol. 24, Issue 3, retrieved from http://graphics.stanford.edu/courses/cs468-07-winter/Papers/imh-rpsm-05.pdf,, published Jul. 2005, 8 pages.

Junichi Nakamura, Image Sensors and Signal Processing for Digital Still Cameras, retrieved from http://ultra.sdk.free.fr/docs/DxO/Image%20Sensors%20and%20Signal%20Processing%20for%20Digital%20Still%20Cameras.pdf, published Aug. 5, 2005, 322 pages.

Karpenko, et al., Digital Video Stabilization and Rolling Shutter Correction using Gyroscopes, Proceedings: In Stanford University Computer Science Technical Report, retrieved from http://130.203.133.150/viewdoc/download;jsessionid=8FC1F22E2FA3465F3F2-10886A92171B7?doi=10.1.1.228.8061&rep=rep1&type=pdf, published Oct. 1, 2011, 7 pages.

Lee, et al., Video Stabilization using Robust Feature Trajectories, IEEE 12th International Conference on Computer Vision, retrieved from http://ieeexplore.ieee.org/stamp/stamp.jsp?tp=&arnumber=5459297, published Sep. 29, 2009, 8 pages.

(56) References Cited

OTHER PUBLICATIONS

Lin, et al., Smoothly Varying Affine Stitching, IEEE Conference on Computer Vision and Pattern Recognition, retrieved from http://research.microsoft.com/en-us/um/people/yasumat/papers/affinestitch_cvpr11.pdf, published Jun. 20, 2011, 13 pages.

Liu, et al., "Bundled Camera Paths for Video Stabilization", ACM Transactions on Graphics (TOG), vol. 32, No. 4, Article 78, Jul. 23, 2013, pp. 78:1-78:10.

Liu, et al., Content-Preserving Warps for 3D Video Stabilization, ACM Transactions on Graphics, vol. 28, Issue 3, retrieved from http://research.cs.wisc.edu/graphics/Papers/Gleicher/fliu/siggraph09_preprint_small.pdf, published Aug. 2009, 9 pages.

Liu, et al., Subspace Video Stabilization, Journal of ACM Transactions on Graphics, vol. 30, Issue 1, retrieved from https://graphics.cs.wisc.edu/Papers/2011/LGWJA11/subspace.pdf, published Jan. 2011, 10 pages.

Liu, et al., Video Stabilization with a Depth Camera, IEEE Conference on Computer Vision and Pattern Recognition, retrieved from http://www.cs.huji.ac.il/~peleg/CVPR2012/data/papers/012_P1A-12.pdf, published Jun. 16, 2012, 7 pages.

Lucas, et al., An Iterative Image Registration Technique with an Application to Stereo Vision, 7th International Joint Conference on Artificial Intelligence, vol. 2, retrieved from hfip://www.ces.clemson.edu/~stb/klt/lucas_bruce_d_1981_1.pdf, published Aug. 24, 1981, 6 pages.

Matsushita, et al., Full-Frame Video Stabilization with Motion Inpainting, Journal of IEEE Transactions on Pattern Analysis and Machine Intelligence, vol. 28, Issue 7, retrieved from http://research.microsoft.com/en-us/UM/people/yasumat/papers/fullframe_pami06.pdf, published Jul. 2006, 14 pages.

Morimoto, et al., Evaluation of Image Stabilization Algorithms, IEEE International Conference on Acoustics, Speech and Signal Processing, vol. 5, retrieved from http://ieeexplore.ieee.org/stamp/stamp.jsp?tp=&arnumber=678102, published May 12, 1998, 5 pages.

Nir, et al., Over-Parameterized Variational Optical Flow, International Journal of Computer Vision, vol. 76, Issue 2, retrieved from http://www.researchgate.net/publication/220659602_Over-Parameterized_Variational_Optical_Flow/file/d912f5088e5bb96078.pdf, published Feb. 2008, 12 pages.

PCT Search Report & Written Opinion for Application No. PCT/CN2013/079852, dated May 7, 2014, 12 pages.

Schaefer, et al., Image Deformation using Moving Least Squares, Journal of ACM Transactions on Graphics, vol. 25, Issue 3, retrieved from http://delivery.acm.org/10.1145/1150000/1141920/p533-schaefer.pdf? p=203.8.109.15&acc=ACTIVE%20SERVICE&key=C2716FEBFA981EF1193B1DAAE4F8BDAFA31CC7C692744019&CFID=338418116&CFTOKEN=62707418&_acm_=1371016169_b86be44e5abbd99da73c811078ee6af3, published Jul. 2006, 8 pages.

Shum, et al., Construction of Panoramic Image Mosaics with Global and Local Alignment, International Journal of Computer Vision, vol. 36, Issue 2, retrieved from http://research.microsoft.com/pubs/75614/ShumSzeliski-IJCV00.pdf, published Feb. 2000, 48 pages.

Smith, et al., Light Field Video Stabilization, IEEE International Conference on Computer Vision, retrieved from http://pages.cs.wisc.edu/~lizhang/projects/lfstable/SmithICCV09.pdf, published Sep. 29, 2009, 8 pages.

Szeliski, et al., Motion Estimation with Quadtree Splines, Journal of IEEE Transactions on Pattern Analysis and Machine Intelligence, vol. 18, Issue 12, retrieved from http://research.microsoft.com/pubs/75661/SzeliskiShum-ICCV95.pdf, published Dec. 1996, 7 pages.

Tomasi, et al., Bilateral Filtering for Gray and Color Images, Sixth International Conference on Computer Vision, retrieved from http://www.cs.duke.edu/~tomasi/papers/tomasi/tomasiIccv98.pdf, published Jan. 4, 1998, 8 pages.

Wu, et al., Video Quality Classification Based Home Video Segmentation, IEEE International Conference on Multimedia and Expo, retrieved from http://www/cecs.uci.edu/~papers/icme05/defevent/papers/cr1147/pdf, published on Jul. 6, 2005, 4 pages.

Zhang, et al., Video Stabilization Based on a 3D Perspective Camera Model, Visual Computer: International Journal of Computer Graphics, vol. 25, Issue 11, retrieved from http://www.shaoyuanlong.com/pub/videostabilization.pdf, published Oct. 2009, 12 pages.

Zhang, et al., "Video stabilization based on a 3D perspective camera model", The Visual Computer, International Journal of Computer Graphics, vol. 24, No. 11, Feb. 13, 2009, Springer Berlin, pp. 997-1008.

PCT International Preliminary Report on Patentability in Application PCT/CN2013/079852, dated Jan. 26, 2016, 5 pgs.

U.S. Appl. No. 14/904,944, Notice of Allowance dated Apr. 11, 2017, 9 pgs.

Chinese 1st Office Action in Application 201380078364.5, dated Dec. 4, 2017, 8 pages.

* cited by examiner

ADAPTIVE PATH SMOOTHING FOR VIDEO STABILIZATION

CROSS-REFERENCE TO RELATED APPLICATIONS

This application is a continuation of, and claims priority to, U.S. patent application Ser. No. 14/904,944, filed on Jan. 13, 2016, now issued U.S. Pat. No. 9,697,587, which is a non-provisional of, and claims priority to, PCT Application No. PCT/CN2013/079852, filed on Jul. 23, 2013, the entirety of which are incorporated by reference herein.

BACKGROUND

A video captured with a hand-held device (e.g., a cellphone or a portable camcorder) often appears shaky and unstable. Video quality has become significantly important, in part, due to the ubiquitous presence and availability of mobile devices (e.g., mobile phones, tablets, camcorders, and so on) capable of capturing video.

Digital video stabilization can improve video quality of such video, but many types of digital video stabilization have a number of shortcomings. For example, digital video stabilization may remove jitter from a video, but at the expense of introducing video artifacts, such as image distortion, cropping, resolution loss, and so on. Thus, a demand exists for a digital video stabilization technique that can improve video quality without introducing an excessive number of undesirable artifacts.

SUMMARY

This disclosure describes, in part, techniques and architectures for video stabilization, which can be used to transform a shaky-looking video to a steady-looking video. Video stabilization can include a camera path smoothing process that generates a smoothed camera path from an original shaky camera path. Using a relatively large smoothing kernel comprising a number of video frames, a path smoothing process can remove both high frequency jitters and low frequency bounces, and can preserve discontinuous camera motions (such as relatively quick panning or scene transitions) to avoid excessive cropping or geometry distortion in the smoothed camera path. A path smoothing process may be performed in a sliding window based implementation, which can be used for real-time stabilization.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

In various embodiments, techniques and devices for video stabilization include path smoothing to transform a shaky video to a steady-looking video. A smoothing process can generate a modified camera path from an originally-shaky or erratic camera path corresponding to a video captured by a handheld camera, for example. A path smoothing process that includes a sliding window-based implementation can remove both high frequency jitters (e.g., from a shaking hand of a camera user) and low frequency bounces (e.g., from a walking or rocking motion of the user) from a camera path, and can preserve discontinuous camera motions (such as quick panning or scene transitions) to avoid excessive cropping or geometry distortion. Such techniques or devices can be used for real-time or offline video stabilization.

In some embodiments, a system for video stabilization comprises a video input port to receive a video comprising a sequence of video frames. A video partition module communicatively connected to the video input port partitions the video into a number of sequences of video frames. The video partition module can be implemented by hardware, software, firmware, or a combination thereof. The video partition module can apply frame delays to individual sequences of the sequences of video frames. Consequently, neighboring sequences can have duplicate video frames. In particular, consecutive sequences can be identical to each other except that one sequence is frame-delayed with respect to the other sequence. As part of a sliding window-based implementation, the video partition module can provide the frame delayed individual sequences to individual video buffer processors that perform video smoothing. In particular, an individual video buffer processor can include a feature extraction module, a homography estimation module, and an adaptive path smoothing module.

In some implementations, any of a video buffer processor, a feature extraction module, a homography estimation module, and an adaptive path smoothing module may comprise hardware, software, firmware, or a combination thereof. For example, a video buffer processor implemented by hardware can selectively execute software comprising the feature extraction module, the homography estimation module, and the adaptive path smoothing module. The video buffer processor can include, or can access, memory comprising a plurality of buffers to store sequences of video frames. In another example, a video buffer processor comprising executable code can selectively operate a hardware-implemented feature extraction module, a hardware-implemented homography estimation module, and a hardware-implemented adaptive path smoothing module. The video buffer processor can include, or can access, memory comprising a plurality of buffers to store sequences of video frames.

The feature extraction module identifies object features in individual video frames of a sequence of the video frames. For example, such object features can comprise points, edges, or other affine objects in the individual video frames.

A homography estimation module performs homographic estimation between or among video frames of the sequence of video frames to generate a modified sequence of video frames. The homographic estimation is based, at least in part, on the identified object features. In some implementations, homographic estimation is performed between consecutive video frames of the sequence of video frames. An adaptive path smoothing module determines estimation errors among video frames of the modified sequence of video frames and applies adaptive path smoothing to the modified sequence of video frames to generate a smoothed sequence of video frames. The adaptive path smoothing can be based, at least in part, on changes among the individual video frames of the sequence of the video frames and on the estimation errors.

In some embodiments, a system for video stabilization may further comprise a video aggregation module configured to combine the smoothed sequence of video frames with other smoothed sequences of video frames to produce an aggregated video portion, and to apply post-process filtering to smooth the aggregated video portion. These other smoothed sequences are products of respective individual video buffer processors. In various implementations, the other smoothed sequences of video frames from individual video buffer processors are based, at least in part, on sequences of frame-shifted video frames that are respectively offset from the sequence of video frames by an integer multiple of n frames, wherein n is a predetermined number.

Various embodiments are described further with reference to FIGS. 1-9.

Example Environment

Figure 1:
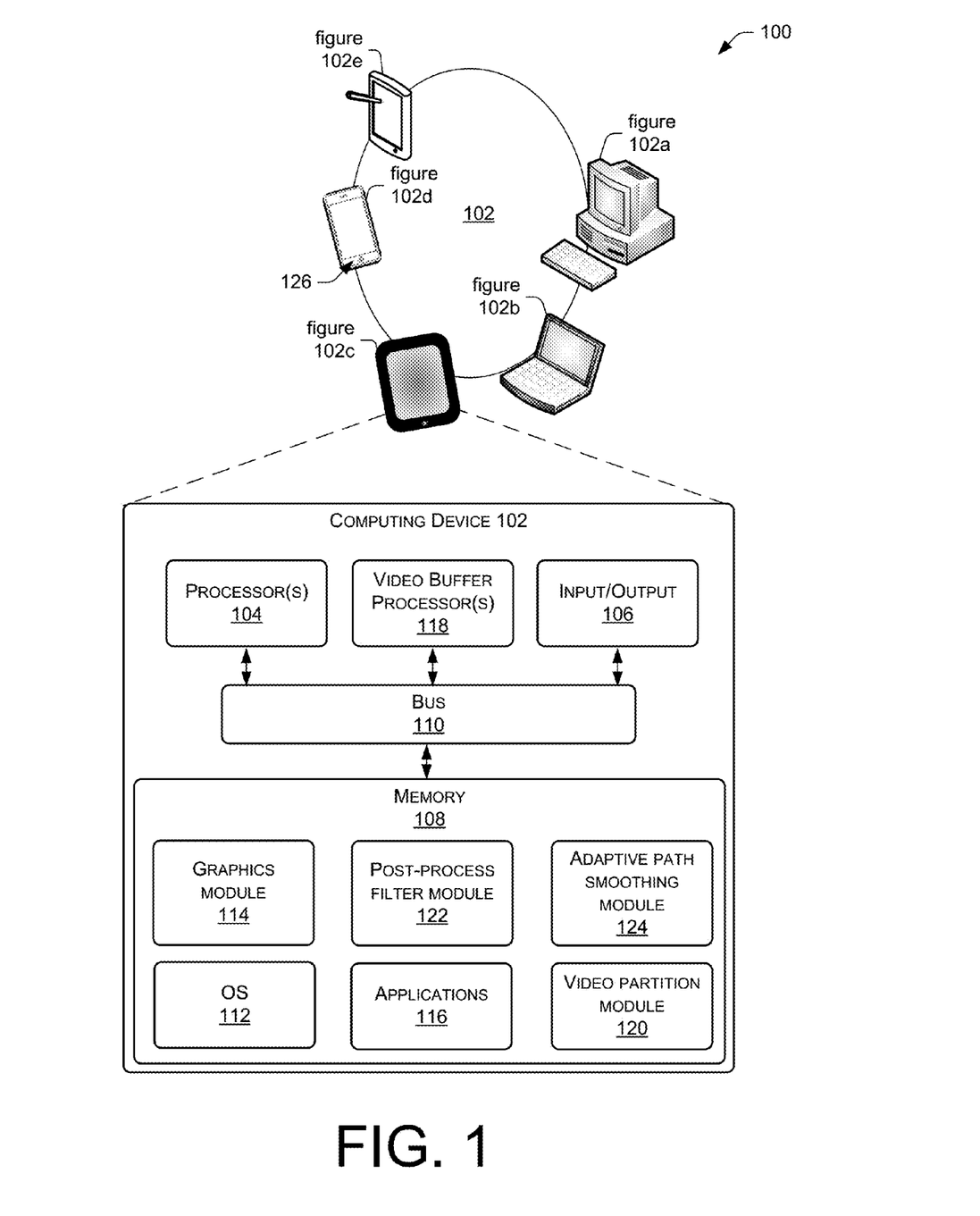
FIG. 1 is a block diagram depicting an example environment in which techniques described herein may be implemented.

The environment described below constitutes but one example and is not intended to limit the claims to any one particular operating environment. Other environments may be used without departing from the spirit and scope of the claimed subject matter. FIG. 1 shows an example environment 100 in which embodiments involving video stabilization as described herein can operate. In some embodiments, the various devices and/or components of environment 100 include a variety of computing devices 102. In various embodiments, computing devices 102 include devices 102a-102e. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102a, laptop computers 102b, tablet computers 102c, telecommunication devices 102d, personal digital assistants (PDAs) 102e, electronic book readers, wearable computers, automotive computers, gaming devices, etc. Computing devices 102 can also include business or retail oriented devices such as, for example, server computers, thin clients, terminals, and/or work stations. In some embodiments, computing devices 102 can include, for example, components for integration in a computing device, appliances, or another sort of device. In some embodiments, some or all of the functionality described as being performed by computing devices 102 may be implemented by one or more remote peer computing devices, a remote server or servers, or a cloud computing resource. For example, computing devices 102 can execute applications that are stored remotely from the computing devices.

In some embodiments, as shown regarding device 102c, memory 108 can store instructions executable by the processor(s) 104 including an operating system (OS) 112, a graphics module 114, and programs or applications 116 that are loadable and executable by processor(s) 104. The one or more processors 104 may include central processing units (CPUs), graphics processing units (GPUs), video buffer processors, and so on. In some implementations, a video partition module 120 comprises executable code stored in memory 108 and is executable by processor(s) 104 and/or video buffer processors 118. An adaptive path smoothing module 124 comprised executable code stored in memory 108 and executable by processor(s) 104. The adaptive path smoothing module 124 determines estimation errors among video frames of a modified video frame sequence and applies adaptive path smoothing to the modified video frame sequence to generate a smoothed video frame sequence. The adaptive path smoothing is based, at least in part, on changes among individual video frames of an original video frame sequence.

Though certain modules have been described as performing various operations, the modules are merely one example and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some embodiments, as shown regarding device 102d, a computing device can be associated with a camera 126 capable of capturing video. For example, a handheld device can include such a camera and computing device 102. Memory 108 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media. In various embodiments, memory 108 is an example of a computer storage medium storing computer-executable instructions that, when executed by processor(s) 104 and or video buffer processor(s) 118, configure the processor(s) to, among other things, identify object features in individual video frames of a sequence of the video frames; perform homographic estimation between or among video frames of the sequence of video frames to generate a modified sequence of video frames, wherein the homographic estimation is based, at least in part, on the identified object features; determine estimation errors among video frames of the modified sequence of video frames; and apply adaptive path smoothing to the modified sequence of video frames to generate a smoothed sequence of video frames, wherein the adaptive path smoothing is based, at least in part, on changes among the individual video frames of the sequence of the video frames and on the estimation errors.

An input device can include any of a variety of devices that are intended to provide and/or imply motion to an object presented visually on an output device. For example, in various embodiments an input device can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 102 can include one or more input/output (I/O) interfaces 106 to allow the computing device 102 to communicate with other devices. Input/output (I/O) interfaces 106 can also include one or more network interfaces to enable communications between computing device 102 and other networked devices such as other device(s) 102. Input/output (I/O) interfaces 106 can allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
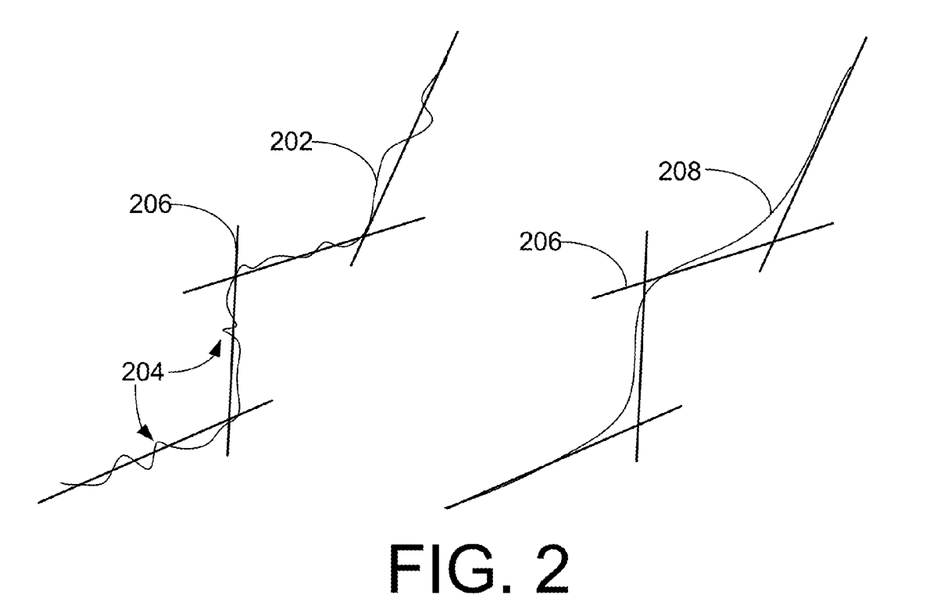
FIG. 2 shows a depiction of video stabilization by camera path smoothing and post-processing curve smoothing, according to various example embodiments.

FIG. 2 shows a depiction of video stabilization by camera path smoothing and post-processing curve smoothing, according to various embodiments. Path 202 represents an original camera path corresponding to motion of a camera during capture of a video. Camera motion may include relatively rapid movements (shakes) corresponding to an unstable, unsteady hand of a user holding a camera. Camera motion can also include relatively slow movements (wobble) corresponding to walking or rocking motion of the user.

Such motion of a camera can be manifested as position changes of image objects in video frames. More specifically, movement of the camera during a time span between capturing a first frame of a video and a second frame of a video can lead to a translation of positions of objects in the second frame relative to the first frame. Camera movement can also lead to rotation of objects in the second frame relative to the first frame. Camera motion toward or away from the plane of the captured images can change the scale of objects from the first frame to the second frame. Accordingly, original camera path 202 can be determined by considering translation, rotation, and scale change between or among a plurality of video frames. The latter parameter, scale change, when relatively small, can be disregarded so that only motion in a single plane is considered.

In various embodiments, images of video frames of an original video can be modified so that a modified video comprising modified video frames will appear relatively smooth and steady. The original video frames are modified so as to effectively remove relatively rapid (e.g., short time constant) image changes between frames. Such rapid image changes correspond to rapid camera path changes, examples of which are depicted by 204 in FIG. 2. Some techniques for modifying video frames include smoothing portions of a video (e.g., a sequence of frames) leading to a series of smoothed camera path segments 206. As explained in detail below, the smoothed camera path segments 206 can overlap one another and include discontinuities as a consequence of the process that generated the smoothed camera path segments 206. Thus, as shown in the right-hand image of FIG. 2, post-processing filtering techniques can generate a smooth and continuous path 208. Output video for display can be based, at least in part, on such a continuous path 208. Accordingly, shakes and wobble in the original video can be reduced or eliminated in the output video.

Figure 3:
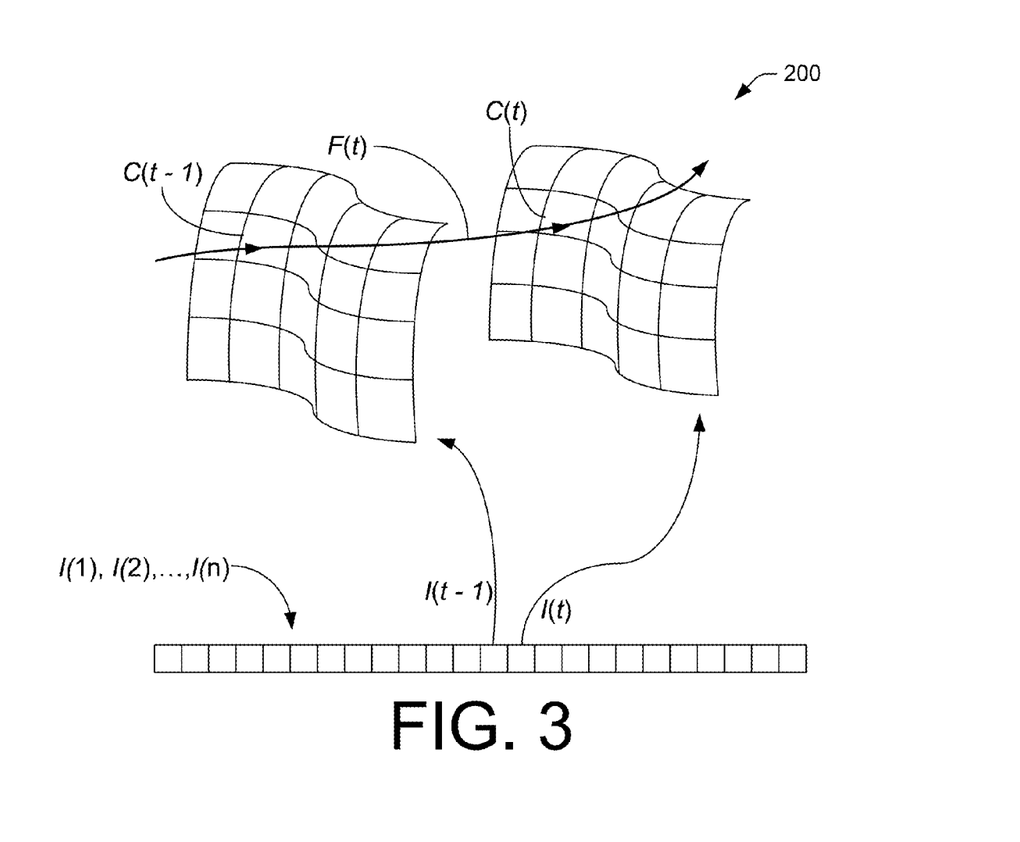
FIG. 3 is a schematic diagram showing two video frames of a camera path, according to various example embodiments.

FIG. 3 is a schematic diagram showing two video frames I(t−1) and I(t) of a camera path 300 that includes a series of frames I(t), for t=0, 1, 2 . . . , according to various example embodiments. Modeling and defining terms in this fashion is useful for developing techniques for smoothing video, as described below. Planar homography can be used to represent relative camera motion between consecutive video frames. For a video comprising the sequence of video frames I(t), for t=0, 1, 2 . . . , a homography F(t) between each pair of neighboring frames (I (t−1), I (t)) can be computed from their corresponding feature points (e.g., such as affine image features generated by KLT, SIFT, or SURF). Camera pose C(t) is defined at frame I(t) as $$C(t)=C(t-1)F(t-1), \Rightarrow C(t)=F(0)F(1)\ldots F(t-1). \quad (1)$$

$\{F(0), F(1), \ldots, F(t-1)\}$ are estimated homographies for each frame over the sequence.

Given an original camera path C={C(t)}, a new smoothed path P={P(t)} is determined. Desirable conditions for P are that P should be relatively close to C while being smooth everywhere (e.g., no discontinuities) except at rapid changes in C. For example, rapid changes may be intentional, such as when a user quickly rotates a camera to capture an image of a quickly-moving object. Thus, it can be desirable to maintain some rapid path changes.

A process of determining P can involve minimizing the following objective function:

$$O(\{P(t)\})=\Sigma_t(\|P(t)-C(t)\|^2+\lambda_t\Sigma_{r\in\Omega_t}w_{t,r}(C)\cdot\|P(t)-P(r)\|^2), \quad (2)$$

where $\Omega_t$ is the neighborhood of video frames at frame t. For example, such a neighborhood of video frames can include I(t−30), I(t−29), . . . , I(t), I(t+1), . . . , I(t+30) (e.g., 30 frames before and 30 frames after frame t). A relatively large kernel $\Omega_t$ (e.g., 60 frames) can suppress both high-frequency jitters (e.g., from handshakes) and low-frequency bounces (e.g., from walking motion), though claimed subject matter is not so limited.

In Eqn. 2, the term $\|P(t)-C(t)\|^2$ is a data term that tends to constrain the new camera path P to be relatively close to the original camera path C to reduce cropping and geometry distortion. The term $\|P(t)-P(r)\|^2$ is a smoothness term to stabilize the camera path. Adaptive weight $w_{t,r}(C)$ is a factor that, among other things, preserves motion discontinuities under fast panning/rotation or scene transition. The factor $\lambda_t$ is adjustable to balance the data term and the smoothness term.

The adaptive weight $w_{t,r}(C)$ tends to preserve camera path discontinuity. In some implementations $w_{t,r}(C)$ comprises a product of three Gaussian functions:

$$w_{t,r}(C)=\exp(-(t-r)^2/2\sigma^2)*\exp(-(C(t)-C(r))^2/2\alpha^2)*\exp(-(I(t)-T_r^t(I(r)))^2/2\beta^2) \quad (3)$$

The first Gaussian function $\exp(-(t-r)^2/2\sigma^2)$ provides larger weight to nearby video frames (with respect to frame I(t)) and less weight to video frames more distant from frame I(t). In some examples, $\sigma$ can be set equal to $\Omega_t/3$, though claimed subject matter is not so limited.

The second Gaussian function $\exp(-(C(t)-C(r))^2/2\alpha^2)$ provides a measurement of change between two camera poses. To measure such change of camera poses, the change in translation components x(t), y(t) extracted from the camera pose C(t) can be used. Such change can be expressed as $|x(t)-x(r)|+|y(t)-y(r)|$. The frame translation $x_t$, $y_t$ can describe camera motions that do not include in-plane rotation or scale change about a principal axis.

The third Gaussian function $\exp(-(I(t)-T_r^t(I(r)))^2/2\beta^2)$ computes a homography fitting error as a sum of squared difference (SSD) between two frames subsequent to homography-based registration. The transformation $T_r^t$ can be generated by evaluating $T_r^t = C_t^{-1}C_r^1$. When there are large occlusions or depth changes in a scene of a video frame, the homography-based motion model can become less effective for registering neighboring frames. In such a case, the SSD error can be large, and the smoothing strength of $w_{t,r}(C)$ can be reduced, so as to desirably preserve camera path discontinuity, which may be an intentional feature.

Figure 4:
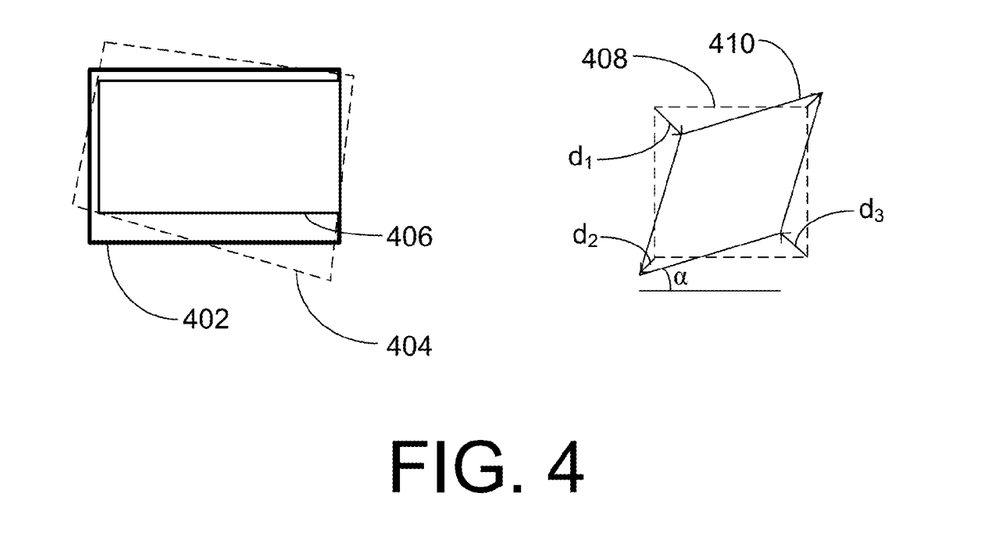
FIG. 4 includes schematic diagrams illustrating frame cropping and distortion, according to various example embodiments.

FIG. 4 includes schematic diagrams illustrating aspects of frame cropping and distortion, according to various embodiments. The left-hand drawing shows an input frame 402, a stabilized frame 404, and an overlapping region 406. The right-hand drawing shows another input frame 408 and a distorted frame 410. Angle $\alpha$ is a parameter to measure a degree of distortion. A set of displacement values, d (including a set $d_1, d_2, d_3, \ldots$), can also be used to measure a degree of distortion. An image stabilization process involves various amounts of frame stabilization, overlap, and distortion, among other things, for different frames, as explained below.

The adaptive term $w_{t,r}(C)$ (Eqn. 3) can allow for some ability to control cropping and distortion of video frames. However, adaptively adjusting the parameter $\lambda_t$ in the objective function (Eqn. 2) for each frame can provide additional control for cropping ratio and distortion. For example, the objective function can be evaluated using an initial fixed value for $\lambda_t$ (e.g., 5), and the resulting cropping ratio and distortion of every frame can be checked to determine whether particular criteria are met. For example, for any frame that does not satisfy particular user requirements (e.g., cropping ratio or distortion is smaller than a pre-defined threshold), the parameter $\lambda_t$ can be adjusted (e.g., incremented or decremented) by a step (e.g., $1/10\lambda_t$) and the objective function can be re-evaluated with the new value for $\lambda_t$. Such a procedure can be iterated until all frames satisfy user requirements.

Figure 5:
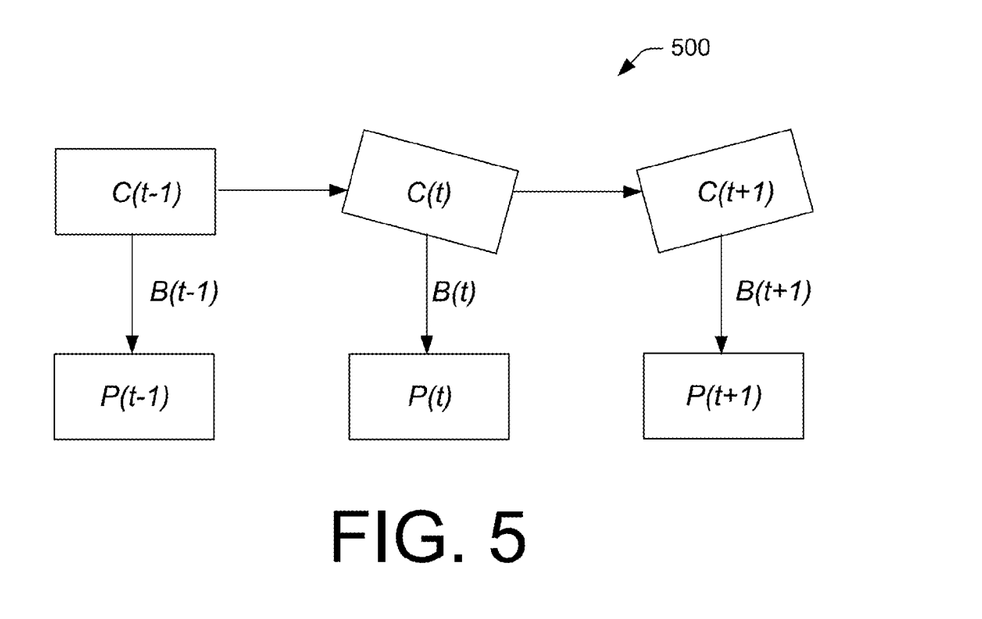
FIG. 5 is a schematic diagram showing relationships between original camera paths and smoothed camera paths, according to various example embodiments.

FIG. 5 is a schematic diagram showing relationships 500 between original camera paths and smoothed camera paths, according to various embodiments. The notation C(t−1) in FIG. 5 is different from the notation C(t−1) in FIG. 3 to account for individual grid cells being considered in FIG. 3 and not individually considered in FIG. 5. Cropping ratio and distortion used in an estimation of $\lambda_t$ can be measured using a warping transform $B(t)=C(t)^{-1}P(t)$. For example, an anisotropic scaling of B(t) can be used to evaluate distortion (e.g., parameters $\alpha$ and displacements d shown in FIG. 4), which can be computed by a ratio of the two largest eigenvalues of an affine part of B(t). Referring to FIG. 4, B(t) can also be used to compute an area of overlapping region 406 of an original video frame 402 and a stabilized frame 404. A cropping ratio is defined as a ratio of overlapping area to the original frame area.

Returning to Eqn. 2, a linear system solver, such as a Jacobi-based iterative solver, can be used to solve the quadratic objective function $O(\{P(t)\})$. Accordingly, the objective function $O(\{P_t\})$ can be written as $$P(t)^{(\xi+1)}=(C(t)+\Sigma_{r\in\Omega_t}\lambda_t w_{t,r}P(r)^{(\xi)})/(1+\lambda_t\Sigma_{r\in\Omega_t}w_{t,r}) \quad (4)$$

In this equation, $\xi$ is an iteration index (e.g., $\xi=20$). With a solved optimal path $\{P(t)\}$, the transform $B(t)=C^{-1}(t)P(t)$ can be computed to map the original camera path C(t) to an optimal path P(t). A final stabilized frame can be obtained by applying the transform B(t) to the input frame I(t) by bilinear interpolation.

An optimal path P(t) can comprise a series of overlapping smoothed video frame sequence, examples of which are the smoothed camera path segments 206 shown in FIG. 2. Such overlapping is beneficial in that post-process filtering or smoothing need not operate on discontinuous path segments, which could lead to poor results. Overlapping smoothed video frame sequences can be generated by a number of techniques. For example, video segments can be arranged to overlap with one another if, for example, $\epsilon$ is selected to be less than $\tau$. In this case, every two neighboring segments have ($\tau-\epsilon$) overlapped frames and each frame (except for start and end frames) is processed in a smoothing event ($\tau/\epsilon-1$) number of times in distinct segments. Since each frame has different estimations occurring in different video segments, these different estimations can be aggregated together from different segments into a single aggregated path (e.g., smoothed camera path segments 206). A hybrid adaptive smoothing can be performed in a post-processing step to further remove discontinuities in the aggregated path (e.g., continuous path 208) while maintaining crop size and distortion below predefined threshold values. For example, to maintain a desired cropping size and distortion during post-processing, $\lambda_t$ may be re-estimated from an earlier optimization process for an aggregated camera path. $\lambda_t$ can be estimated from a warping transform $B(t)=C^{-1}(t)\hat{P}(t)$, where $\hat{P}_t$ is an estimated camera pose after aggregating all estimations $P_t$ in different video segments. Estimated $\lambda_t$ can then be used in a hybrid adaptive path smoothing. The "hybrid" means that two different window sizes $2\Omega_t/3$ and $\Omega_t/3$ are successively applied in an adaptive smoothness term $\Sigma_{r\in\Omega_t}w_{t,r}(C)\cdot\|P(t)-P(r)\|^2$. In some cases, several (e.g., 2 or 4) iterations may lead to convergence. After post-processing, the aggregated path is smoothed and provided as output video having a final stabilized camera path. In some implementations, post-processing can be implemented in real time. For example, video stabilization techniques that include post-processing can be performed substantially in parallel with a process of capturing (e.g., recording) or receiving video. In other implementations, post-processing can be implemented offline. For example, video stabilization techniques that include post-processing can be performed on video files generated at an earlier time.

Figure 6:
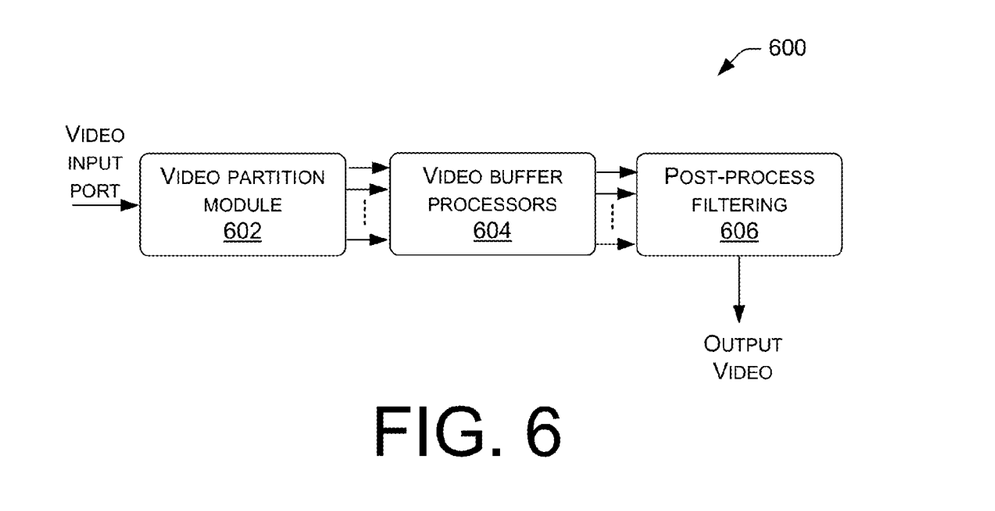
FIG. 6 is a block diagram of a video stabilization device, according to various example embodiments.

FIG. 6 is a block diagram of a video stabilization device 600, according to various embodiments. Although video stabilization device 600 is described as a device in various examples, processes and techniques performed by video stabilization device 600 can alternatively be performed by a processor executing code stored in memory. Device 600, which can be included in computing device 102, performs video stabilization using a sliding window filtering technique to stream-process video segments by temporal sliding windows, as described below. Compared with whole video sequence processing, stream-processing videos by a temporal sliding window provides a number of benefits. For example, for offline stabilization, users can play video while the video is simultaneously stabilized in the background (e.g., sans user involvement other than playing video). In another example, for real-time stabilization, videos can be real-time stabilized during video capture. To achieve this feature, a video stabilization system may include a video buffer processor having a particular size. The buffer size τ can be constrained or selected by considering processer power and memory requirements of the video stabilization system (e.g., which may comprise a computer or mobile device).

A video partition module 602 includes a video input port to receive input video comprising video frames. In some implementations, video partition module 602 comprises executable code. In this case, a video input port can receive electronic signals representative of input video. The video partition module 602 partitions the input video into a number of sequences of video frames. Individual sequences are respectively provided to video buffer processors 604. For example, a first sequence of video frames is provided to a first video buffer processor, a second sequence of video frames is provided to a second video buffer processor, and so on. The sequences of input video are streamed into the video buffer processor 604 to undergo a video stabilization process by adaptive path smoothing. After such path smoothing, ϵ frames (e.g., ϵ=5) of respective video sequences stream out of individual video buffer processors to be rendered as video output frames. Remaining frames of each video sequence can be aggregated with new inflow frame sequences so as to be combined into a new aggregated video sequence, which will subsequently be smoothed in a post-processing event performed by post-process filter module 606, as explained below. This procedure can be repeated until an entire video is processed.

Figure 7:
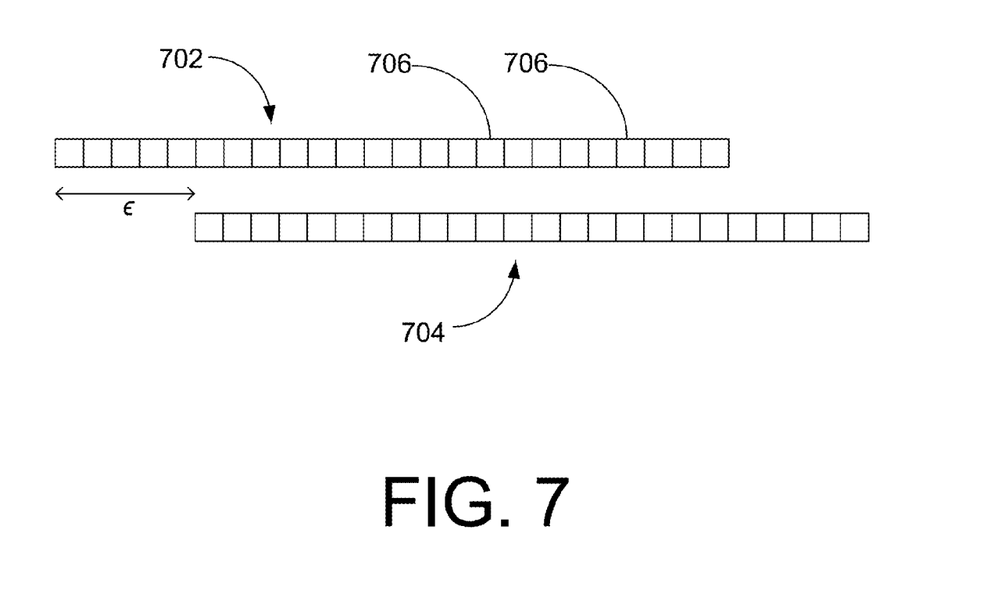
FIG. 7 is a schematic diagram of two video sequences of video frames, according to various example embodiments.

FIG. 7 is a schematic diagram of two video frame sequences 702 and 704, according to various embodiments. Descriptions of video frame sequences are useful for explaining ideas and defining terms of a sliding window filtering technique. The video frame sequences comprise a plurality of frames 706. Video frame sequences 702 and 704 are offset from one another by ϵ frames. Such offset corresponds to a time delay of one frame sequence relative to the other frame sequence.

Figure 8:
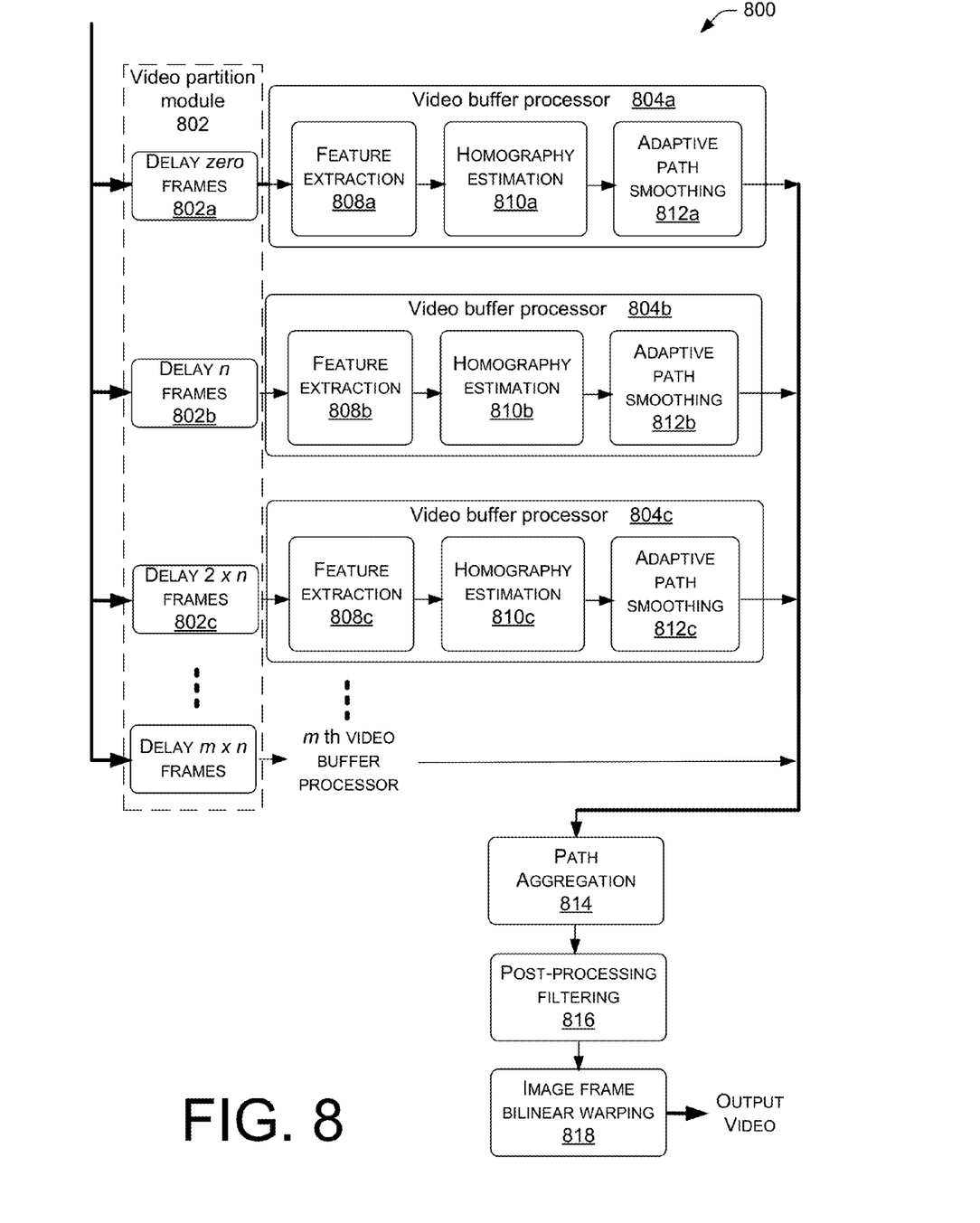
FIG. 8 is a block diagram of a portion of a video stabilization device, according to various example embodiments.

FIG. 8 is a block diagram of a portion of a video stabilization device 800, according to various example embodiments. Although video stabilization device 800 is described as a device in various examples, processes and techniques performed by video stabilization device 800 can alternatively be performed by a processor executing code stored in memory. A video partition module 802, which may be similar to video partition module 602 shown in FIG. 6, can be used to provide video frame sequences to video processors 804a, 804b, 804c, and so on. The video partition module 802 can provide a first video frame sequence via block 802a to video buffer processor 804a with no relative offset or delay, provide a second video frame sequence via block 802b to video buffer processor 804b with an offset or delay of n frames, provide a third video frame sequence via block 802c to video buffer processor 804c with an offset or delay of 2 n frames, provide a fourth video frame sequence to the next video buffer processor with an offset or delay of 3 n frames, and so on. The video partition module can continue this pattern for m+1 video buffer processors. Accordingly, successive video buffer processors are provided video frame sequences that are successively frame-wise delayed from one video buffer processor to the next video buffer processor. For example, such frame-wise delay is depicted in FIG. 7, where video frame sequences 702 and 704 are offset from one another by ϵ frames.

Upon or after video buffer processor 804a receives a video frame sequence, feature extraction module 808a identifies object features in individual video frames of the video frame sequence. For example, such object features can comprise points or edges in the individual video frames. Subsequently, homography estimation module 810a performs homographic estimation between consecutive video frames of the video frame sequence to generate a modified video frame sequence. The homographic estimation is based, at least in part, on the object features identified by feature extraction module 808a. Adaptive path smoothing module 812a determines estimation errors among video frames of the modified video frame sequence and applies adaptive path smoothing to the modified video frame sequence to generate a smoothed video frame sequence. The adaptive path smoothing is based, at least in part, on changes among the individual video frames of the video frame sequence and on the estimation errors.

Successive video buffer processors 804b and 804c perform processes similar to that described above for video buffer processor 804a. Video frame segments provided to the successive video buffer processors 804b and 804c, however, are successively delayed for one video buffer processor to the next video buffer processor. As explained above, the video partition module 802 provides a video frame sequence to video buffer processor 804b with an offset or delay of n frames and provides a third video frame sequence to video buffer processor 804c with an offset or delay of 2 n frames, and so on. The video buffer processors (804a, 804b, and 804c . . . ) can operate on their respective video frame sequences in a parallel fashion.

Video buffer processor 804a generates an output comprising a smoothed video frame segment. An example of several such smoothed video segments may be the smoothed camera path segments 206 shown in FIG. 2. As explained earlier, smoothed video segments, individually generated by video buffer processors (804a, 804b, and 804c . . . ), include overlapping segments. These smoothed video segments generated by the video buffer processors are provided to path aggregation module 814, which aggregates the individual smoothed video segments. The aggregated smoothed video segments are then provided to post-process filtering module 816, which performs a hybrid adaptive smoothing to further remove discontinuity in the aggregated smoothed video segments while maintaining crop size and distortion below predefined threshold values. Post-process filtering module 816 thus generates a smoothed continuous path, an example of which is continuous path 208 in FIG. 2. The smoothed continuous path is then provided to image frame bilinear-warping module 818, which then outputs a video for viewing. To do bilinear warping, we first map each pixel coordinate (x, y) at frame t to new coordinates (x', y') according to the inverse warping transformation $B^{-1}(t)$. Then, the pixel value $I'_{x,y}$ is determined by the bilinear interpolation of its neighboring four pixels $I_{\lfloor x' \rfloor, \lfloor y' \rfloor}$, $I_{\lfloor x'+1 \rfloor, \lfloor y' \rfloor}$, $I_{\lfloor x' \rfloor, \lfloor y'+1 \rfloor}$, $I_{\lfloor x'+1 \rfloor, \lfloor y'+1 \rfloor}$, where $\lfloor x' \rfloor$ is the maximum integer beyond x'.

Figure 9:
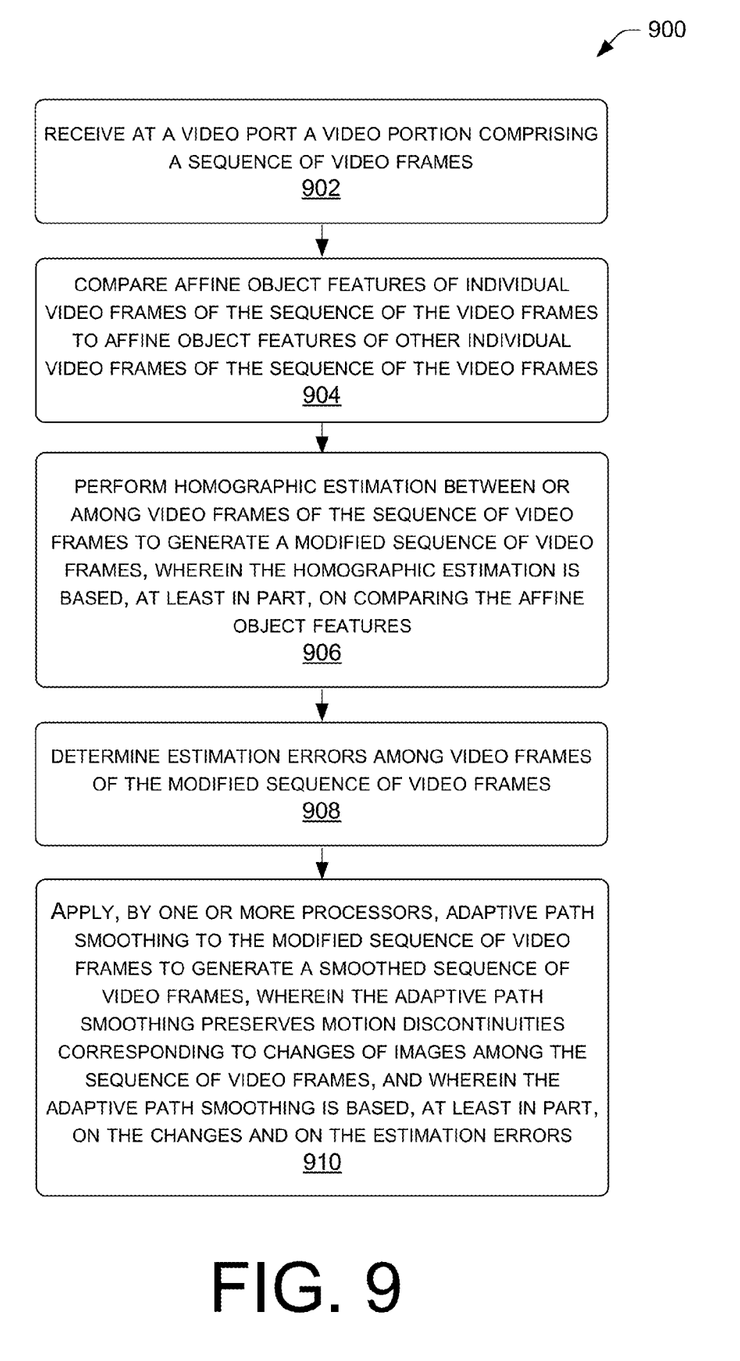
FIG. 9 is a flow diagram of an example process for smoothing video.

FIG. 9 is a flow diagram of a process 900 for smoothing video, according to various embodiments. In an example, such a process can be performed by video stabilization device 800. At block 902 a portion of a video is received via a video port. The video portion comprises a sequence of video frames. At block 904, affine object features of individual video frames of the sequence of the video frames are compared to affine object features of other individual video frames of the sequence of the video frames. At block 906, homographic estimation between or among video frames of the sequence of video frames is used to generate a modified sequence of video frames. The homographic estimation is based, at least in part, on the comparing process of block 904. For example, homographic estimation may include generating mappings among individual video frames based, at least in part, on object features identified in the comparing process. At block 908, estimation errors among video frames of the modified sequence of video frames are determined. At block 910, adaptive path smoothing is applied to the modified sequence of video frames to generate a smoothed sequence of video frames. The adaptive path smoothing preserves motion discontinuities corresponding to changes of images among the sequence of video frames. The adaptive path smoothing is based, at least in part, on these changes and on the estimation errors determined at block 908.

The flows of operations illustrated in FIGS. 6, 8, and 9 are illustrated as collections of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, perform the recited operations. In the context of hardware, the blocks may represent one or more circuits (e.g., application specific integrated circuits—ASICs) configured to execute the recited operations.

Any routine descriptions, elements, or blocks in the flows of operations illustrated in FIGS. 6, 8, and 9 may represent modules, segments, or portions of code that include one or more executable instructions for implementing specific logical functions or elements in the routine.

CONCLUSION

Although the techniques have been described in language specific to structural features and/or methodological acts, it is to be understood that the appended claims are not necessarily limited to the features or acts described. Rather, the features and acts are described as example implementations of such techniques.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are used to indicate that certain embodiments include, while other embodiments do not include, the noted features, elements and/or steps. Thus, unless otherwise stated, such conditional language is not intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described embodiments, the elements of which are to be understood as being among other acceptable examples. All such modifications and variations are intended to be included herein within the scope of this disclosure.

What is claimed is:

1. A system, comprising:
   one or more processors; and
   a memory storing instructions that, when executed by the one or more processors, perform a method, comprising:
      identifying object features in a sequence of video frames;
      generating a modified sequence of video frames based, at least in part, on the object features;
      determining estimation errors among video frames of the modified sequence of video frames; and
      applying adaptive path smoothing to the modified sequence of video frames to generate a smoothed sequence of video frames, wherein the adaptive path smoothing is based, at least in part, on the estimation errors.

2. The system of claim 1, further comprising instructions for:
   receiving a video;
   partitioning the video into the sequence of video frames and additional sequences of video frames;
      applying frame delays to individual sequences of the additional sequences of video frames to create frame delayed additional sequences; and
      providing the frame delayed additional sequences to individual buffers associated with the one or more processors.

3. The system of claim 2, wherein applying the frame delays further comprises frame-shifting video frames of the additional sequences of video frames so that the frame delayed additional sequences are respectively offset from the sequence of video frames.

4. The system of claim 1, wherein generating the modified sequence of video frames includes performing homographic estimation between or among video frames of the sequence of video frames, wherein the homographic estimation is based, at least in part, on the object features.

5. The system of claim 1, further comprising instructions for:
   combining the smoothed sequence of video frames with other smoothed sequences of video frames to produce an aggregated video portion; and applying post-process filtering to smooth the aggregated video portion.

6. The system of claim 5, wherein the other smoothed sequences of video frames are based, at least in part, on sequences of frame-shifted video frames that are respectively offset from the sequence of video frames.

7. The system of claim 1, wherein the object features identified in the sequence of video frames comprise points or edges in individual video frames of the sequence of video frames.

8. The system of claim 1, wherein the adaptive path smoothing is further based on changes among individual video frames of the sequence of video frames.

9. The system of claim 8, wherein at least a portion of the changes correspond to panning, rotation, or a scene transition in a video associated with the sequence of video frames.

10. One or more computer-readable storage media storing computer-executable instructions that, when executed by one or more processors, configure the one or more processors to perform operations comprising:
identifying object features in a sequence of video frames;
generating a modified sequence of video frames based, at least in part, on the object features;
determining estimation errors among video frames of the modified sequence of video frames; and
applying adaptive path smoothing to the modified sequence of video frames to generate a smoothed sequence of video frames, wherein the adaptive path smoothing is based, at least in part, on the estimation errors.

11. The one or more computer-readable storage media of claim 10, further comprising instructions for partitioning a video into a plurality of sequences of video frames including the sequence of video frames.

12. The one or more computer-readable storage media of claim 10, wherein the object features comprise points or edges in individual video frames of the sequence of video frames.

13. The one or more computer-readable storage media of claim 10, wherein generating the modified sequence of video frames includes generating mappings among individual video frames of the sequence of video frames.

14. The one or more computer-readable storage media of claim 13, wherein generating the mappings further comprises performing homographic estimation between or among the individual video frames of the sequence of video frames.

15. The one or more computer-readable storage media of claim 10, wherein the adaptive path smoothing is also based, at least in part, on changes among individual video frames of the sequence of video frames.

16. A method, comprising:
identifying object features in a sequence of video frames;
generating a modified sequence of video frames based, at least in part, on the object features;
determining estimation errors among video frames of the modified sequence of video frames; and
applying, by one or more processors, adaptive path smoothing to the modified sequence of video frames to generate a smoothed sequence of video frames, wherein the adaptive path smoothing is based, at least in part, on the estimation errors.

17. The method of claim 16, wherein the object features comprise affine object features, the method further comprising:
comparing first affine object features identified in first video frames of the sequence of video frames to second affine object features identified in second video frames of the sequence of video frames,
wherein the generating the modified sequence of video frames is based, at least in part, on the comparing.

18. The method of claim 16, wherein generating the modified sequence of video frames includes performing homographic estimation between or among video frames of the sequence of video frames.

19. The method of claim 18, wherein the homographic estimation is performed between consecutive video frames of the sequence of video frames.

20. The method of claim 16, wherein the adaptive path smoothing is further based on changes among individual video frames of the sequence of video frames, and wherein at least a portion of the changes correspond to panning, rotation, or a scene transition in a video associated with the sequence of video frames.

* * * * *